July 31, 1962  A. W. RANGER  3,046,883
VARIABLE SPEED MECHANISMS
Filed Nov. 14, 1960  6 Sheets-Sheet 2
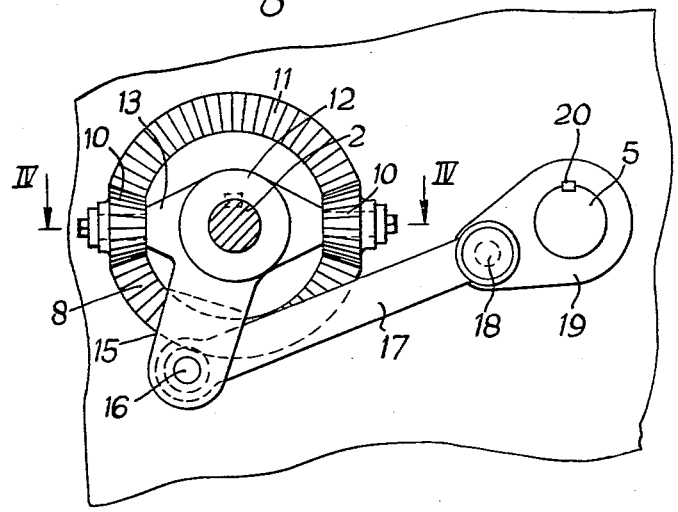
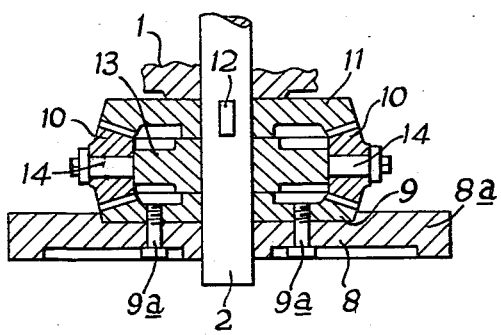

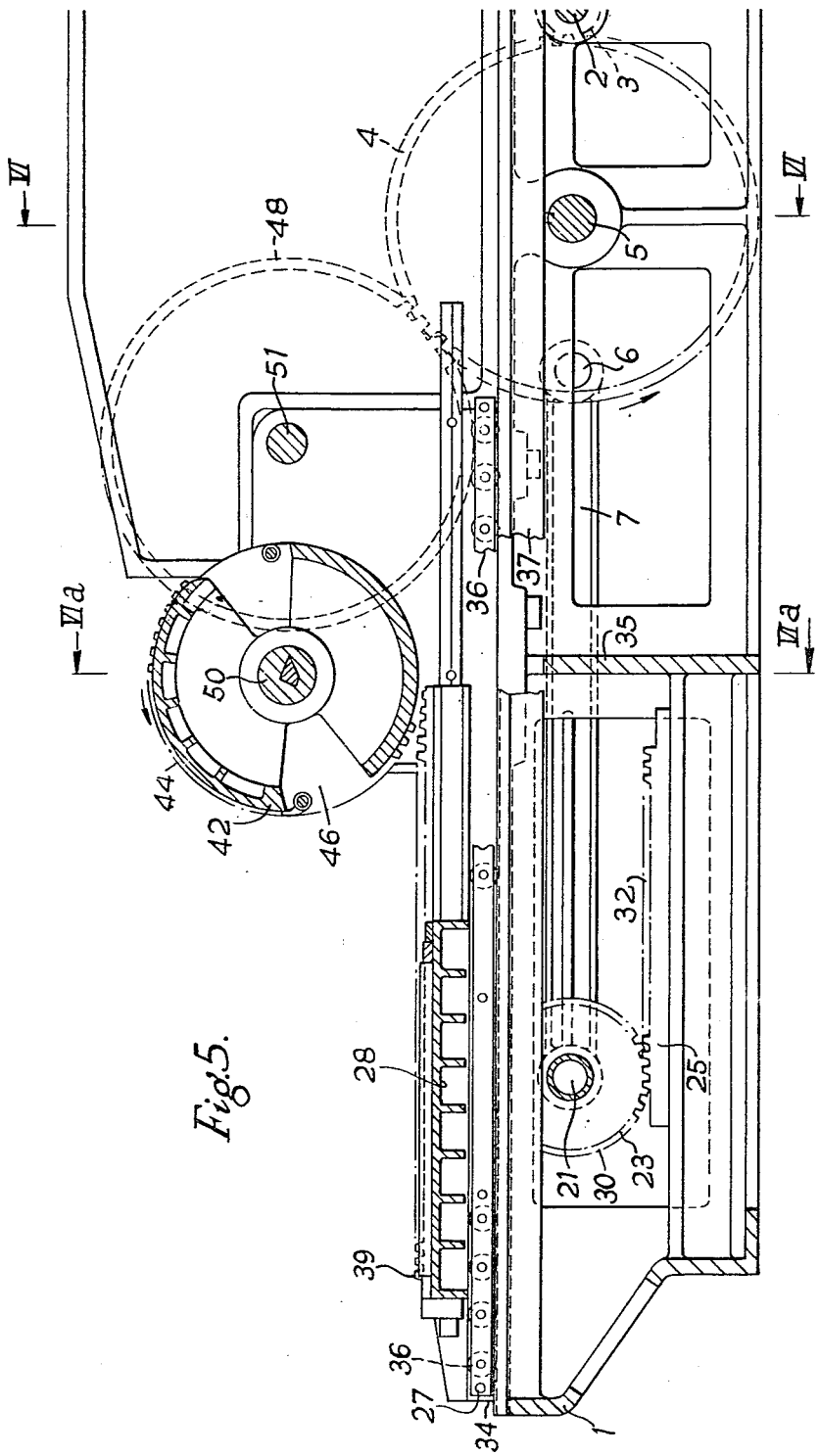

United States Patent Office 3,046,883
Patented July 31, 1962

3,046,883
VARIABLE SPEED MECHANISMS
Arthur Willard Ranger, Brighton, Sussex, England, assignor to Schnellpressenfabrik Aktiengesellschaft Heidelberg, Heidelberg, Germany
Filed Nov. 14, 1960, Ser. No. 69,200
Claims priority, application Great Britain Jan. 6, 1960
7 Claims. (Cl. 101—282)

This invention relates to variable speed mechanisms suitable, for example, for driving a machine having a reciprocating member so that the member is driven at different respective speeds during a working and a return stroke thereof.

In a flatbed printing machine it is desirable to drive the reciprocable printing bed of the machine at a lower speed during the printing stroke and at a higher speed during the return stroke of the bed. It is an object of the present invention to provide a variable speed mechanism which will permit this to be done without having to carry out expensive modifications of the main driving gearing of the machine.

The present invention includes a variable speed mechanism comprising a flywheel, a shaft on which the flywheel is freely rotatably mounted, first gear means rotatable about the shaft with the flywheel, a carrier freely rotatably mounted on the shaft, second gear means mounted on the carrier and engaging the first gear means so as to be driven thereby, third gear means mounted on the shaft so as to be rotatable therewith and operatively engaging the second gear means, and means for rocking the carrier on the shaft in one sense corresponding with the sense of rotation of the flywheel or in an opposite sense, whereby, when the carrier is rocked in the one sense the shaft is driven by the third gear means at a first lower speed and when the carrier is rocked in the opposite sense, the shaft is driven at a second higher speed.

Suitably, the first gear means comprise an internally toothed ring, the second gear means comprise at least one pinion mounted on the carrier and operatively engaging the teeth of the ring, and the third gear means comprise a pinion keyed to the shaft and operatively engaging the pinion on the carrier.

Alternatively, the first gear means comprise a ring formed with bevel teeth, the second gear means comprise at least one bevel gear mounted on the carrier and operatively engaging the teeth of the ring and the third gear means comprise a gear keyed to the shaft and having bevel teeth operatively engaging the bevel gear on the carrier.

The means for rocking the carrier, suitably, include at least one further pinion carried on the shaft, a driven shaft on which is keyed a main gear co-operating with the further pinion, crank means driven by the main gear, and a link connecting the crank means with the carrier so that on rotation of the driven shaft the carrier is rocked by the link and drives the shaft carrying the flywheel for successive periods at different speeds according to whether the carrier is rocked in the sense of rotation of the flywheel or in the sense opposite thereto.

Suitably, the main gear on the driven shaft is provided with a crank pin carrying one end of a connecting rod an opposite end of which is adapted to drive a reciprocable member, for example, the printing bed of a flatbed printing machine.

The variable speed mechanism of the invention is particularly suitable for imparting to the printing bed of a flatbed printing machine, a lower speed of printing stroke and a higher speed of return stroke.

The invention, therefore, also includes a flatbed printing machine having a reciprocable printing bed and including a variable speed mechanism comprising a flywheel, a first shaft on which the flywheel is freely rotatably mounted, first gear means rotatable about the first shaft with the flywheel, a carrier freely rotatably mounted on the first shaft, second gear means mounted on the carrier and engaging the first gear means so as to be rotatable therewith and operatively engaging the second gear means, a pinion keyed to a first shaft, a second shaft extending parallel with the first shaft, a main gear keyed to the second shaft and co-operating with the pinion carried on the first shaft, first crank means carried by the second shaft, a connecting rod adapted reciprocably to drive the printing bed, second crank means driven by the main gear and link means so connecting the second crank means with the carrier as to effect rocking of the carrier during rotation of the second shaft alternately in a first sense corresponding with the sense of rotation of the flywheel and in a second sense opposite to the first sense, whereby, during rocking of the carrier in the first sense, the first shaft is caused to rotate at a lower speed and imparts a relatively low speed of movement to the printing bed whilst, during rocking of the carrier in the opposite sense, the first shaft is caused to rotate at a higher speed and imparts a relatively high speed of movement to the printing bed.

Advantageously, the relative positions of the first and second crank means are arranged to ensure that the first shaft rotates at a lower speed during the printing stroke and at a higher speed during the return stroke of the printing bed.

Desirably, the printing bed may be driven through connecting rods provided at opposite sides of the bed. In these circumstances, it becomes possible to provide on the main frame of the machine a cross-girt of uninterrupted vertical section which is disposed beneath the printing cylinder for withstanding the high impressional loads arising during printing.

The invention will now be described, by way of example, with reference to the accompanying drawings, in which:

FIGURE 3 is a side elevation of a modified form of certain parts of the mechanism illustrated in FIGURES 1 and 2;

FIGURE 4 is a sectional plan view taken on the line IV—IV of FIGURE 3;

FIGURE 5 is a sectional side elevation of a flatbed printing machine in which the driving means are coupled to the sides rather than to the centre of the printing bed;

Throughout the drawings similar parts have been accorded the same references.

Figure 1:
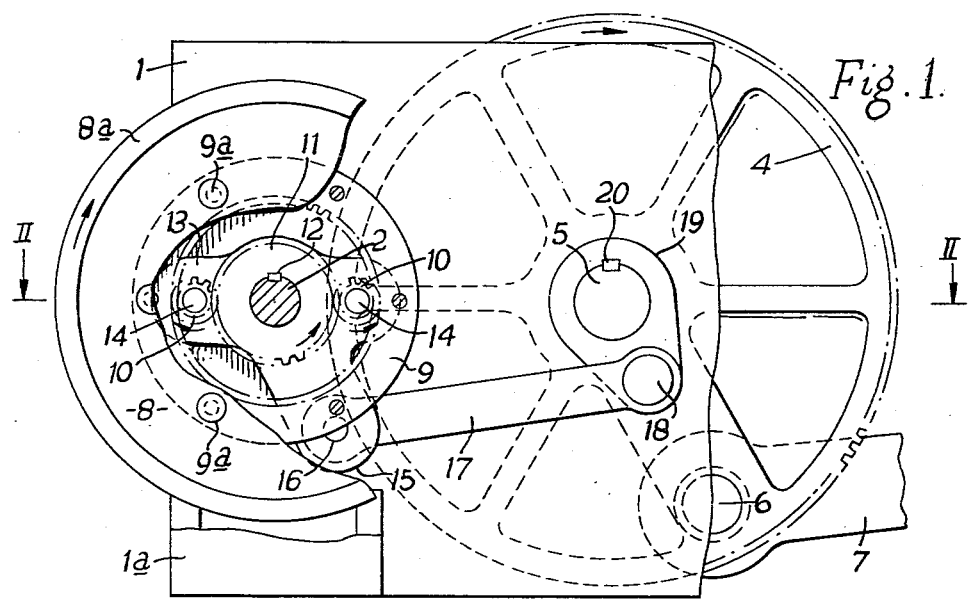
FIGURE 1 is a side elevation, with parts broken away for the sake of clarity, of a variable speed mechanism according to the invention and utilised as part of the driving mechanism for the printing bed of a flatbed printing machine.
Figure 2:
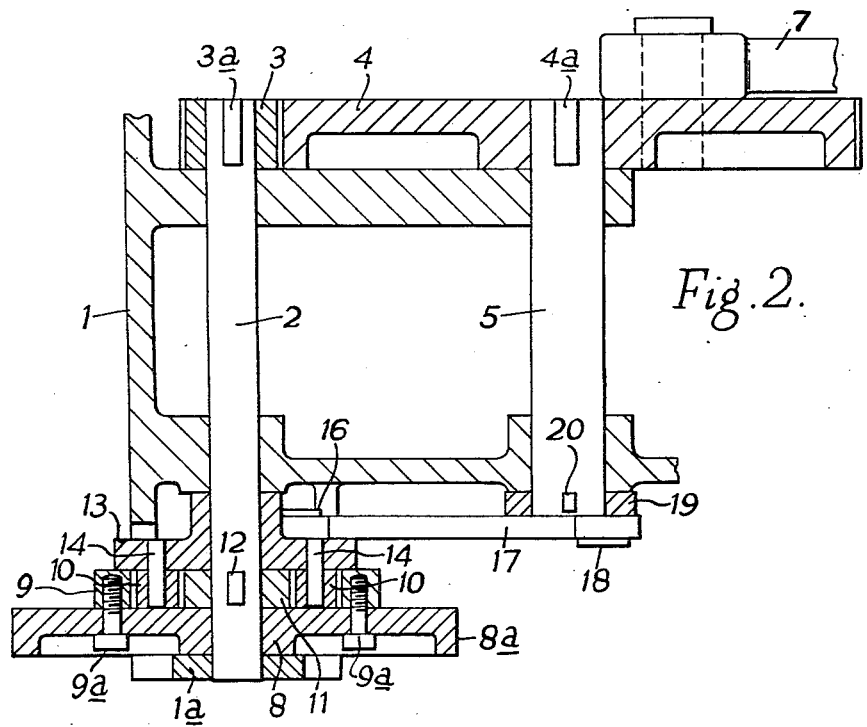
FIGURE 2 is a sectional plan view of the mechanism illustrated in FIGURE 1 and taken on the line II—II of that figure.
Figure 6:
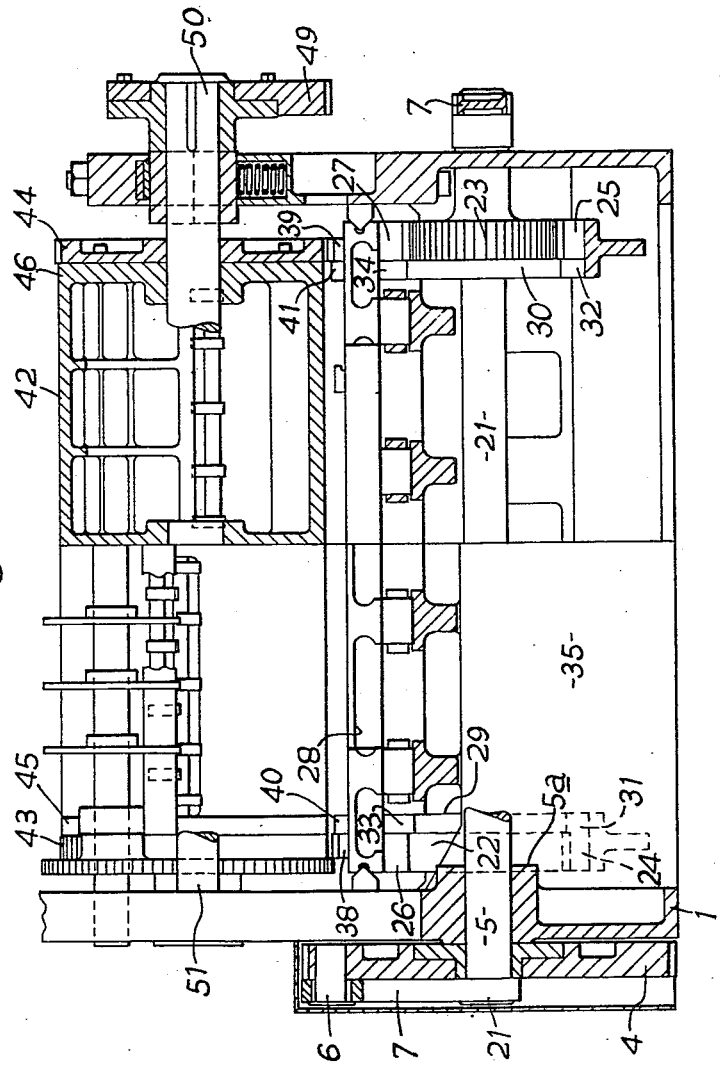
FIGURE 6 is a view partly in section taken on the lines VI—VI and VIa—VIa of FIGURE 5.
Figure 7:
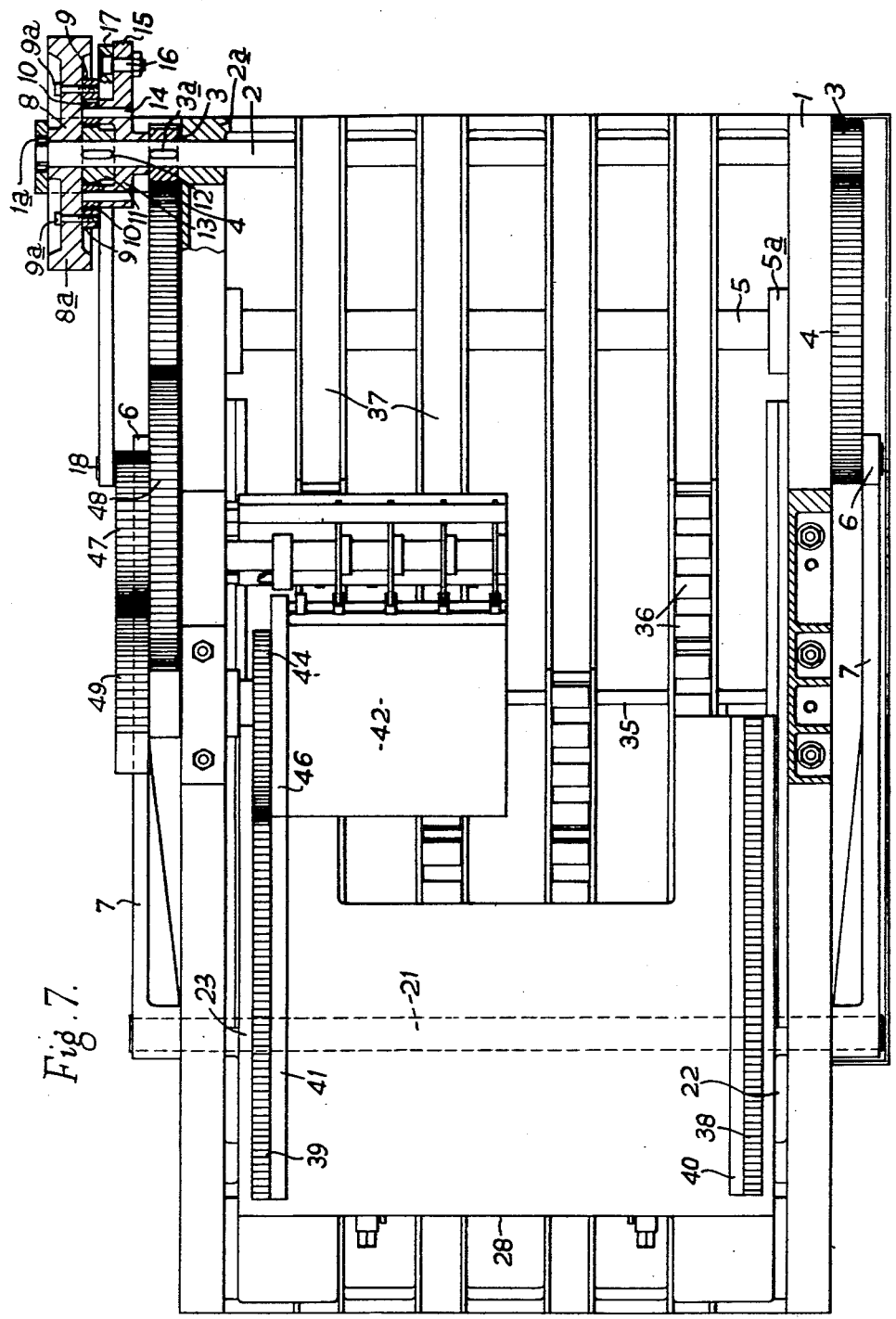
FIGURE 7 is a plan view partly in section of the machine illustrated in FIGURES 5 and 6; and, FIGURE 8 is a side elevation of the machine illustrated in FIGURES 5 to 7.

Referring to FIGURES 1 and 2, a frame 1 of a flatbed printing machine carries a first or driving shaft 2 which extends transversely with respect to the direction of movement of the printing bed (not shown). At its inner end, the shaft 2 has keyed thereto by means of a key 3a, a pinion 3 which is disposed in a vertical plane parallel to that containing the longitudinal axis of the bed. The pinion 3 meshes with a main gear 4 keyed as by a key 4a to a shaft 5 which is mounted on the frame 1 and extends parallel with the driving shaft 2. The gear 4 carries a crank pin 6 on which is pivotally secured one end of a connecting rod 7 the opposite end of which is pivotally secured to means provided at the underside of the bed centrally thereof. The printing bed is constrained to move in a horizontal plane and is reciprocated by means of the connecting rod 7 on rotation of the main gear 4.

At its outer end, the driving shaft 2 is supported in a bracket bearing 1a formed on the frame 1 and immediately inwardly of the bracket bearing 1a is a variable speed mechanism 8 which includes a flywheel 8a which is freely rotatably mounted on the shaft 2 and acts as a driving pulley for the bed. To this end, the flywheel 8a may be provided with belt grooves or the like for driving the flywheel from a prime mover, for example an electric motor.

The variable speed driving mechanism 8 includes a first gear means in the form of an internally toothed ring 9 secured by bolts 9a to the flywheel 8a and co-axial therewith. Engaging the teeth of the ring 9 are diametrically opposed pinions 10 constituting a second gear means of the mechanism 8 which engage with a pinion 11 secured by means of a key 12 to the shaft 2, the pinion 11 comprising a third gear means of the variable speed mechanism. The pinions 10 are rotatably mounted on a carrier 13 by means of pins 14. The carrier 13 is formed with an extension arm 15 on an outer end of which is secured a stud 16 on which is pivotally secured one end of a link 17 the other end of which is pivotally mounted on a stud 18 carried on a crank 19 which is keyed by means of a key 20 to the outer end of the shaft 5.

During operation, as the flywheel 8a is driven at uniform speed, the toothed ring 9 rotates with the flywheel and through the pinions 10 drives the pinion 11 in the sense opposite to that of rotation of the flywheel 8a. Rotation of the pinion 11 and therefore of the driving shaft 2 imparts a rotation to the pinion 3 which thus drives the main gear 4 causing reciprocation of the connecting rod 7 and, therefore, of the printing bed of the machine. As the main gear 4 rotates, the link 17 imparts a reciprocating rocking motion to the carrier 13 and as the carrier 13 is rocked in the sense of rotation of the flywheel 8a, the rotational speed of the driving shaft 2 falls below the speed that would be imparted to it by rotation of the flywheel 8a were the carrier 13 held stationary. Similarly, as the carrier is rocked in the sense opposite to that of the rotation of the flywheel 8a, the speed of the driving shaft 2 is increased above that which it would acquire through rotation of the flywheel 8a and were the carrier 13 held stationary.

The reciprocating rocking motion imparted to the carrier 13 determines the changes in speed of the driving shaft 2 and the timing of the rocking motion is dependent upon the angular positions of the stud 18 and the crank pin 6 relative to the axis of the shaft 5. Preferably, the stud 18 and crank pin 6 are disposed as indicated in FIGURE 1 in the same radial plane and on the same side of the shaft 5 but, if desired, their positions may be varied, for example, stud 18 and crank pin 6 may be disposed in the same diametrical plane of the shaft 5 and on opposite sides thereof.

With the stud 18 and pin 6 in the relative position shown in FIGURE 1, as the pin 6, through rotation of the main gear 4 moves from its top to its bottom dead centre position, the carrier 13 has imparted thereto a rocking movement in the sense of rotation of the flywheel 8a which corresponds with a first 180° rotational movement of the crank 19. During this movement of the carrier 13 and crank 19 which corresponds with the driving or printing stroke of the bed of the machine, the shaft 2 rotates at a relatively low speed. During a second subsequent 180° rotational movement of the crank 19, corresponding with the return stroke of the printing bed, the carrier 13 is rocked in the sense opposite to that of the rotation of the flywheel 8a and the speed of the shaft 2 is relatively higher than that obtaining during the driving stroke of the printing bed. Thus, the printing bed is moved on the driving or printing stroke thereof at a lower speed than that which obtains during the return stroke thereof.

Whilst one would be unlikely to require it, if it were desired to drive the bed so that the printing stroke were effected at a higher speed than the return stroke of the bed, the crank 19 would require to be repositioned so as to be angularly spaced by 180° from the pin 6 relative to the axis of the shaft 5. Of course, with the crank 19 and pin 6 in these positions, if the printing and return strokes of the bed were reversed, the result would again be that the speed during the printing stroke would be lower than that during the return stroke.

The invention may thus be applied to any type of machine where it is desired that a reciprocating member shall be moved at different speeds during forward and return movements thereof and is particularly suitable for printing machines employing a reciprocating bed such as stop-cylinder, single revolution or two-revolution machines.

In an alternative construction of the mechanism 8 as shown in FIGURES 3 and 4, the ring 9 is formed with bevel teeth and the pinions 10 are replaced by bevel gears which drive a further bevel gear 11 keyed to the shaft 2. The carrier 13 is thus disposed between the gears 9 and 11. The gears of the mechanism 8 may, therefore, be of any preferred form and proportion and the carrier 13 may be rocked by any suitable means, for example, cam and follower means, according to the design of the machine in which the variable speed mechanism 8 is to be provided.

FIGURES 5 to 8 show an embodiment of a flatbed printing machine incorporating a variable speed mechanism 8 according to the invention for reciprocating a printing bed 28 of the machine so that the printing stroke of the bed is executed at a speed lower than that of the return stroke thereof. In this embodiment, the bed is reciprocated by connecting rods 7 the forward ends of which operate on opposite sides of the bed 28. To this end, the driving shaft 2 and shaft 5 extend transversely across the frame 1 and are supported respectively in bearings 2a and 5a on the frame. The driving shaft 2 carries keyed thereto pinions 3 outwardly of the bearing 2a which engage respective main gears 4 keyed to the shaft 5 outwardly of the bearings 5a. Each main gear 4 has mounted thereon a crank pin 6 on which is pivotally mounted the rear end of a connecting rod 7. The forward ends of the rods 7 are connected by a transverse shaft 21 on which are mounted towards opposite ends thereof gears 22 and 23 which mesh with respective horizontally disposed racks 24 and 25 below the gears 22 and 23 and secured to the frame 1. The gears 22 and 23 also co-operate respectively with further horizontally disposed racks 26 and 27 above the racks 24 and 25 and which are each secured to the underside of the printing bed 28. The gears 22 and 23 are provided with bearers 29 and 30, the racks 24 and 25 with bearers 31 and 32 and the racks 26 and 27 with bearers 33 and 34. The arrangement of the gears 22 and 23 together with the corresponding racks 24, 25, and 26, 27, provides, in known manner, for doubling of the travel of the bed 28 in relation to that of the gears 22 and 23.

Because the connecting rods 7 are disposed outside the frame 1, the mechanism 8 has to be displaced outwardly to allow for the mounting outside the frame on the shaft 2 of the adjacent pinion 3. Further, because the connecting rods 7 are outside the frame 1 it is possible to provide on the frame 1 an upright cross-girt 35 beneath and in the plane containing the axis of a printing cylinder 42 and having an uninterrupted vertical section and affording great rigidity and resistance to impressional loads imparted by the cylinder 42 during printing.

The printing bed 28 is carried in known manner on rollers 36 rotatable in support tracks 37 and is provided on its upper surface with longitudinally extending racks 38 and 39 secured thereto and having bearers 40 and 41.

The printing cylinder 42 has secured at opposite ends thereof interrupted gears 43 and 44 mounted on bearers or hubs 45 and 46. The gears 43 and 44 mesh with the bed racks 38 and 39 at appropriate times during the printing stroke, which, as shown in FIGURE 5, is that in which the bed 28 moves towards the cylinder 42.

During the printing stroke, when the cylinder 42 is nearing the end of its engagement with the bed 28, control of the rotational speed of the cylinder 42 is taken over by an eccentric gear 47 which is secured to a secondary gear 48, the latter gear being mounted on a transverse shaft 51 and in mesh with one of the main gears 4. The eccentric gear 47 meshes with a special gear 49 on a shaft 50 of the printing cylinder 42 whilst the bed racks 38 and 39 and printing cylinder gears 43 and 44 are nearing the end of their mutual engagement. The eccentric gear 47 and special gear 49 continue to rotate the cylinder 42 after disengagement of the cylinder gears 43 and 44 from the bed racks 38 and 39 and during the reversal of the bed 28 and its subsequent re-entry into engagement with the cylinder 42 when the gears 43 and 44 once again engage the racks 38 and 39. The profiles and dispositions of the gears 47 and 49 are such that they impart a peripheral velocity and acceleration to the cylinder 42 corresponding with that of the bed at engagement and disengagement of the bed 28 and cylinder 42.

Between the points of engagement and disengagement of the gears 47 and 49 which approximately correspond with the printing bed leaving and re-engaging the cylinder 42, the rate of change of the cylinder speed is first gradually reduced and then increased to secure smooth working and reduction of shock and the leading and trailing teeth of the gears may be of appropriate profile to assist in this. They may further be divided and spring cushioned in known manner to compensate for play between the racks and gears when the cylinder 42 is tipped, i.e. is lifted to the non-printing position thereof.

Figure 8:
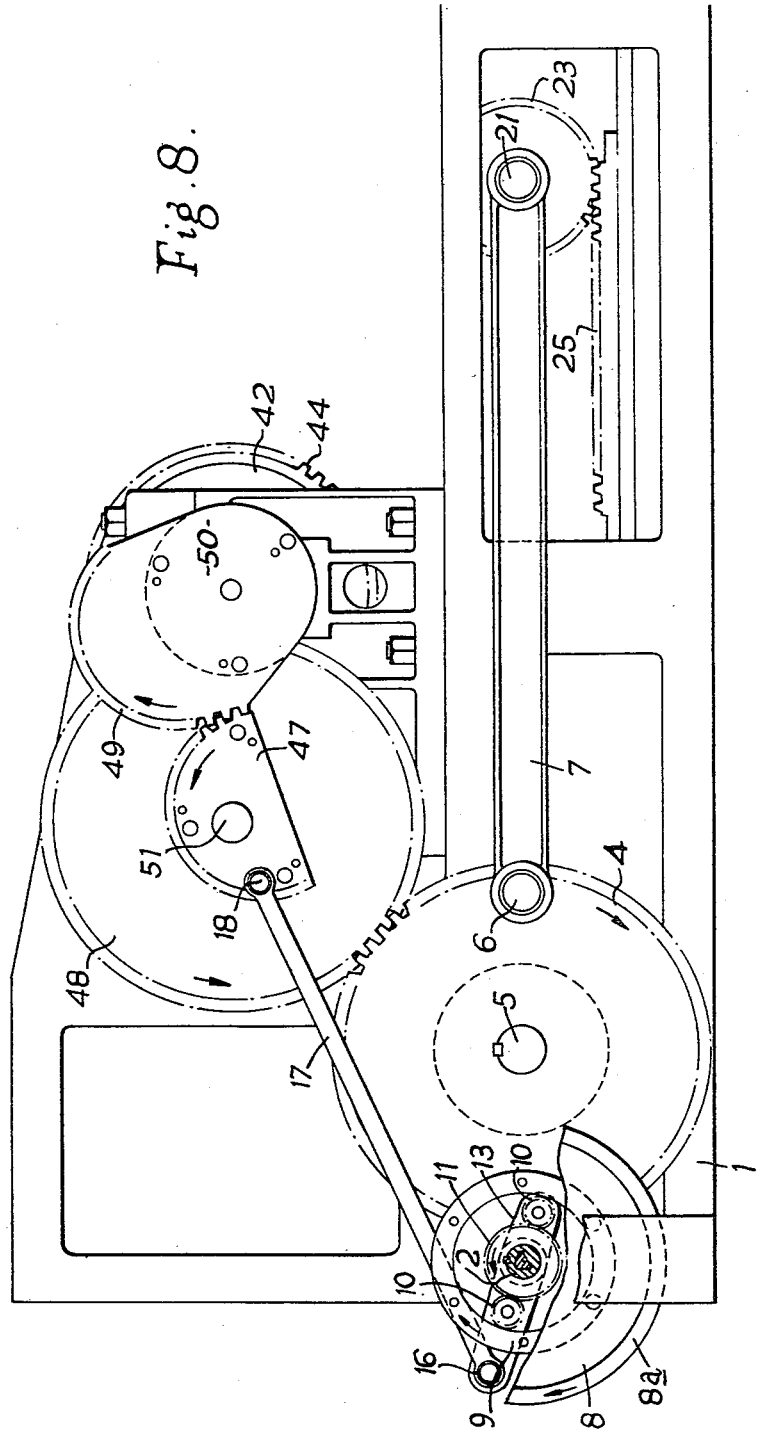

As shown in FIGURE 8, the variable speed gear crank pin 18 is mounted on the eccentric gear 47 and the carrier 13 is rocked by the link 17. Any preferred alternative means may be employed for rocking the carrier 13 of the variable speed gear 8. For example, a cam and follower or slotted lever and roller or the like arrangement could be employed and the bed velocity could therefore be varied from that produced by a crank motion such as has been described.

The printing cylinder 42 may be fitted with a buffer or reacting device (not shown) adapted to reduce momentum of the cylinder as the cylinder speed approaches its minimum value and to assist in increasing its speed after passing this value. To this end the printing cylinder control gear 47 is provided, for example, with a crank pin on its outer face, carrying one end of a piston rod which at its lower end is secured to a piston operating within an associated cylinder mounted on the side frame of the machine. The stroke of the piston is such that during part of its travel it moves past ports or openings in the associated cylinder wall and has no practical effect on the printing cylinder 42 during part of the rotation of the latter. As the printing cylinder approaches the end of its printing period, the piston enters a closed portion of the associated cylinder, thereby compressing the air within the cylinder and so damping the momentum of the printing cylinder until the latter has passed its point of minimum speed which is approximately coincident with the point of highest compression within the cylinder associated with the piston, at which point the crank pin on the outer face of the control gear 47 is in its lowermost position. As the crank pin moves past its lowermost position, the piston will be thrust by the compressed air in the associated cylinder so as to exert pressure on the crank pin and thereby urge the printing cylinder to rotate more quickly. In this way, the load on the driving gear of the printing cylinder is reduced.

Provision may be made for allowing varying proportions of the air to "bleed off" during compression, by means of suitable valves connected to operate appropriately in dependence upon the speed regulation of the machine.

The variable speed gear 8 may be enclosed in an oil-tight casing provided with a gland for the operating link 17. It will be noted that the mechanism 8 may, if preferred, be mounted on a shaft other than the driving shaft and be connected with the driving shaft 2 by suitable gearing.

The invention makes it practicable to vary the printing and non-printing speeds of the bed and printing cylinder within desirable limits, without heavy and costly modification of the main drive components, and has the further advantage that wear on the elements of the variable speed mechanism will have no undesirable effect on the technical efficiency of the machine.

Although the mechanism 8 of the invention has been described for use with a flatbed printing machine, it may also be used on other machines requiring a quick return with a slow working stroke such as shaping, planing or other machines.

What I claim is:

1. A variable speed mechanism comprising a flywheel, a shaft on which the flywheel is freely rotatably mounted, first gear means rotatable about the shaft with the flywheel, a carrier freely rotatably mounted on the shaft, second gear means mounted on the carrier and engaging the first gear means so as to be driven thereby, third gear means mounted on the shaft so as to be rotatable therewith and operatively engaging the second gear means, and means for rocking the carrier on the shaft, said means comprising a pinion carried on the shaft, a driven shaft on which is keyed a main gear co-operating with said pinion, crank means driven by the main gear, and a link connecting the crank means with the carrier so that on rotation of the driven shaft the carrier is rocked by the link and drives the shaft carrying the flywheel for successive periods at relatively low and high speeds according to the carrier being rocked in the direction of rotation of the flywheel in the direction opposite thereto.

2. A mechanism as claimed in claim 1, wherein the main gear on the driven shaft is provided with a crank pin carrying one end of a connecting rod an opposite end of which is adapted to drive a reciprocable member, for example, the printing bed of a flatbed printing machine.

3. A flatbed printing machine having a frame, a printing cylinder mounted in the frame for rotation about its axis, a reciprocable printing bed operably connected to said printing cylinder and including a variable speed mechanism comprising a flywheel, a first shaft on which the flywheel is freely rotatably mounted, first gear means rotatable about the first shaft with the flywheel, a carrier freely rotatably mounted on the first shaft, second gear means mounted on the carrier and engaging the first gear means so as to be driven thereby, third gear means mounted on the first shaft so as to be rotatable therewith and operatively engaging the second gear means, a pinion keyed to said first shaft, a second shaft extending parallel with the first shaft, a main gear keyed to the second shaft and co-operating with the pinion carried on the first shaft, first crank means carried by the second shaft, a connecting rod connected with the first crank means and adapted reciprocably to drive the printing bed, second crank means driven by the main gear and link means so connecting the second crank means with the carrier as to effect rocking of the carrier during rotation of the second shaft alternately in a first sense corresponding with the sense of rotation of the flywheel and in a second sense opposite to the first sense, whereby, during rocking of the carrier in the first sense, the first shaft is caused to rotate at a lower speed and imparts a relatively low speed of movement to the printing bed whilst, during rocking of the carrier in the opposite sense, the first shaft is caused to rotate at a higher speed and imparts a relatively high speed of movement to the printing bed.

4. A machine as claimed in claim 3, wherein the relative positions of the first and second crank means are arranged to ensure that the first shaft rotates at a lower speed during the printing stroke and at a higher speed during the return stroke of the printing bed.

5. A machine as claimed in claim 3 wherein the printing bed is driven through connecting rods provided at opposite sides of the bed and a cross-girt of uninterrupted vertical section is provided on the frame of the machine said cross-girt extending below and in the plane containing the axis of the printing cylinder.

6. A machine as claimed in claim 3, wherein means provided on the printing cylinder co-operate with means driven by the main gear to drive the cylinder at disengagement thereof from and re-engagement thereof with the printing bed at a velocity and acceleration corresponding with the printing bed.

7. A machine as claimed in claim 5, wherein a transverse shaft is mounted in said machine frame and movable longitudinally with respect thereto, said shaft being operably engaged by the connecting rods ends adjacent the printing bed, gears mounted for rotation on said shaft, a longitudinally extending fixed rack mounted on the machine frame, a movable rack mounted parallel to said fixed rack and secured to said printing bed, said racks being spaced apart and simultaneously engaged by said gears mounted on the transverse shaft, whereby longitudinal movement of the rods and attached transverse shaft imparts twice said longitudinal movement to the movable rack and attached printing bed.

References Cited in the file of this patent

UNITED STATES PATENTS

| | | |
|---|---|---|
| 1,537,594 | Elsworth et al. | May 12, 1925 |
| 2,392,349 | Webb | Jan. 8, 1946 |
| 2,697,398 | Pollock | Dec. 21, 1954 |
| 2,866,409 | Buttner | Dec. 30, 1958 |